(12) United States Patent
Huels et al.

(10) Patent No.: US 11,370,499 B2
(45) Date of Patent: Jun. 28, 2022

(54) CRAWLER TRACK, IN PARTICULAR RUBBER CRAWLER TRACK

(71) Applicant: Loc Performance Products, LLC, Plymouth, MI (US)

(72) Inventors: Achim Huels, Barsinghausen (DE); Carsten Behrens, Bilshausen (DE)

(73) Assignee: Loc Performance Products, LLC, Plymouth, MI (US)

( * ) Notice: Subject to any disclaimer, the term of this patent is extended or adjusted under 35 U.S.C. 154(b) by 480 days.

(21) Appl. No.: 16/471,379

(22) PCT Filed: Oct. 19, 2017

(86) PCT No.: PCT/EP2017/076654
§ 371 (c)(1),
(2) Date: Jun. 19, 2019

(87) PCT Pub. No.: WO2018/114085
PCT Pub. Date: Jun. 28, 2018

(65) Prior Publication Data
US 2019/0315418 A1    Oct. 17, 2019

(30) Foreign Application Priority Data

Dec. 19, 2016 (DE) ..................... 10 2016 225 423.5

(51) Int. Cl.
*B62D 55/24* (2006.01)
*B62D 55/26* (2006.01)

(52) U.S. Cl.
CPC ........... *B62D 55/244* (2013.01); *B62D 55/26* (2013.01)

(58) Field of Classification Search
CPC .............................. B62D 55/244; B62D 55/26
See application file for complete search history.

(56) References Cited

U.S. PATENT DOCUMENTS

| | | | | |
|---|---|---|---|---|
| 2,874,005 | A * | 2/1959 | Erik ....................... | B62D 55/28 305/192 |
| 2003/0094854 | A1* | 5/2003 | Rodgers ............... | B62D 55/244 305/166 |
| 2004/0026995 | A1 | 2/2004 | Lemieux | |
| 2006/0238027 | A1 | 10/2006 | Dandurand | |
| 2008/0203813 | A1* | 8/2008 | Doyle .................. | B62D 55/244 305/165 |
| 2011/0121644 | A1 | 5/2011 | Wellman | |

(Continued)

FOREIGN PATENT DOCUMENTS

| CA | 2182845 C | 12/1997 |
|---|---|---|
| JP | H11301535 A | 11/1999 |

*Primary Examiner* — Kip T Kotter
(74) *Attorney, Agent, or Firm* — Panagos Kennedy PLLC; Bill Panagos; Linda Kennedy

(57) ABSTRACT

The present invention relate to a caterpillar track, in particular a rubber caterpillar track, with a track body ad with at least one outer profiling element, preferable with a plurality of outer profiling elements, which are directed outwardly away from the track body. The caterpillar track is characterized in that the outer profiling element has an outwardly directed grouser body and a grouser root, which connects the grouser body to the track body, wherein the outer profiling element has, at least in some sections, a marking which can make the boundary between the grouser body and the grouser root visually and haptically identifiable.

20 Claims, 5 Drawing Sheets

(56) References Cited

U.S. PATENT DOCUMENTS

2012/0242143 A1 9/2012 Feldmann
2015/0042152 A1 2/2015 Lussier
2017/0320528 A1 11/2017 Kim

* cited by examiner

CRAWLER TRACK, IN PARTICULAR RUBBER CRAWLER TRACK

The present invention relates to a caterpillar track, in particular a rubber caterpillar track.

Known drive mechanisms for land vehicles include caterpillar tracks. These may be used not only in the military sector but also for agricultural vehicles and for other vehicles for transportation on rough terrain. Caterpillar tracks usually have on their inside, preferably in the center, inwardly projecting tooth elements, by means of which the caterpillar track can be engaged and propelled by a drive wheel or the like of the vehicle. On their outside, caterpillar tracks usually have a profiling to allow them to find better traction on the underlying surface. This profiling may be realized similarly to a tractor tire, for example, that is to say the profiling may for example have bar-like radial elevations which are arranged on the caterpillar track obliquely with respect to its running direction. The inner-lying tooth elements and the outer-lying profiling elements are usually connected by a caterpillar track body which is of an endlessly closed form.

Caterpillar tracks may be produced from rubber, and are then referred to as rubber caterpillar tracks. Caterpillar tracks may be produced so as to be of an endlessly closed or open form. They may have a tension member for transmitting tensile forces, for example in the form of steel cables, which may be arranged so as to run around several times in the running direction. There may be transverse reinforcements, which can assist in transmitting the forces across the width of the caterpillar track. The tension members and/or transverse reinforcements are usually enclosed in the caterpillar track body, for example are vulcanized in.

To produce rubber caterpillar tracks, it is known for example from EP 1 075 385 B1 to place unvulcanized rubber elements, which are intended to later form the internal teeth of the rubber caterpillar track, into corresponding apertures of a cylindrical inner mold. The caterpillar track body of the same unvulcanized rubber, with tension members embedded therein, is then applied, for example by winding, over the unvulcanized internal teeth or the outer surface of the inner mold. The caterpillar track body is in this case of such a thick construction in the radially outward direction that the outer profiling can be formed from the radially outer unvulcanized material. This is performed by a cylindrical outer mold, which on its inside has the outer contour of the profiling, and the unvulcanized rubber caterpillar track being pressed against one another, such that the outer-lying unvulcanized 15 material is deformed to form the profiling. The vulcanization is then performed within the press.

During the production of a rubber caterpillar track as per EP 1 135 248 B 1, the internal teeth are formed as unvulcanized rubber elements and placed into the corresponding apertures of a cylindrical inner mold. The remaining body of the rubber caterpillar track is constructed separately in an unvulcanized form from the same rubber and then placed onto the inner mold. By pressing the inner mold and outer mold together, the internal teeth are pressed against the body of the rubber caterpillar track from the inside, and the outer shaped segments are formed on the outside of the rubber caterpillar track by pressure. The vulcanization is then performed within the press. The inner mold and the outer mold are in this case of a segmented construction, wherein the segments are initially arranged spaced apart from one another in the circumferential direction and, during the course of the vulcanization, are pressed together so as to produce a cylindrical closed shape.

DE 10 2015 205 071 A1 discloses a method for producing rubber caterpillar tracks in which first unvulcanized shaped elements, which are intended to form the internal teeth of the rubber caterpillar track, are introduced into the corresponding apertures of a mandrel of an inner mold. After that, an unvulcanized body of the rubber caterpillar track with tension members is applied to the shaped elements for internal teeth and to the radial outside of the mandrel. Furthermore, unvulcanized shaped elements of the same rubber material, which are intended to form the external teeth of the rubber caterpillar track, are introduced into corresponding apertures of the outer mold. Subsequently, the inner mold and the outermold are joined together and the body of the rubber caterpillar track with the shaped elements for internal teeth and with the shaped elements for external teeth is vulcanized. In this way, rubber caterpillar tracks with tension members can be produced easily and cost effectively without displacement of the tension members being able to occur during production. At least the displacement of the tension members can be reduced.

With all known rubber caterpillar tracks, it may be disadvantageous that the outwardly facing profiling or the external teeth, which may also be referred to as grousers, can be worn away in the course of use, for example by abrasion. This may cause the properties of the outwardly facing profiling to change. In particular, for example, the effect of achieving better grip on the underlying surface than the other regions of the rubber caterpillar track may be lost. This may occur in particular whenever the region of the outwardly facing grouser body has been worn away, for example by abrasion, and then the grouser root lying thereunder is exposed.

It is therefore desirable to be able to detect such wearing away of the outwardly facing profiling in good time, in order then to change the rubber caterpillar track and/or interrupt or end the use of the corresponding vehicle.

A disadvantage of this has previously been that estimating the wear of the outwardly facing profiling of a rubber caterpillar track is still left to the visual impression of a user. As a result, the decision for example to change a rubber caterpillar track may be made too early or too late.

An object of the present invention is to provide a caterpillar track in particular a rubber caterpillar track, of the type described at the beginning, such that the degree of wear of the outwardly facing profiling can be estimated by a user more accurately than has previously been known. At least, an alternative to known caterpillar tracks, and in particular to known rubber caterpillar tracks, with outwardly facing profiling is to be provided.

The object is achieved according to the invention by a caterpillar track, and in particular by a rubber caterpillar track, with the features and advantageous refinements as described herein.

Consequently, the present invention relates to a caterpillar track, in particular a rubber caterpillar track, with a track body and with at least one outer profiling element, preferably with a plurality of outer profiling elements, which are directed outwardly away from the track body.

The caterpillar track according to the invention is characterized in that the outer profiling element has an outwardly directed grouser body and a grouser root, which connects the grouser body to the track body, wherein the outer profiling element has, at least in some sections, a marking which can make the boundary between the grouser body and the grouser root visually and/or haptically identifiable. Various preferred possibilities of implementing such a marking are explained in more detail below.

In this respect, the present invention is based on the realization that such outer profiling elements have previously had an outwardly uniform appearance. As a result, the reaching of an inadmissibly high amount of wear of the outer profiling element, for example by abrasion on an underlying surface, i.e. the reaching of a wear limit, may only be identified insufficiently accurately.

A wear limit is understood here as meaning a zone, an area or the like which is arranged at least substantially perpendicularly to the direction in which the outer profiling element is directed outwardly away from the track body. If in this case the outer profiling element is divided into an outwardly facing region in the form of a grouser body, the wearing away of which can be regarded as uncritical, and a region lying thereunder in the form of a grouser root, the wearing away of which can be regarded as critical, the wear limit can lie between the grouser body and the grouser root.

It has previously been known that the outer profiling element consists uniformly of the same material and the division into a grouser body and a grouser root is purely from a functional perspective, and is not reflected by them being made of different materials. Consequently, the outer profiling element has previously also been of a uniform color, which is usually black, and had a uniform surface structure. If structurings of the surface of outer profiling elements are known, they have at least previously not had any indication of the wear limit.

Against this background, according to the invention the wear limit is now indicated, at least in some sections, by a marking that is visually and/or haptically discernible by the user, such that the reaching of an inadmissible amount of wear of the grouser body can be identified more easily by the user than in the way previously known.

In this way, better decision making, for example about changing a caterpillar track, than that previously known is possible. On the one hand, this can avoid a caterpillar track that is still usable being changed too early, and so costs can be saved with regard to material and time expended. On the other hand, it can avoid a caterpillar track that has long since become inadmissibly worn or damaged being changed too late, which can increase the safety of use.

Preferably, the visual and/or haptic marking is arranged at least or even exclusively on at least one side, preferably both sides, of the outer profiling element in the transverse direction, since, during use, this region is usually not in contact with the underlying surface at all, or at least to a much lesser extent, than the flanks of the outer profiling element in the height and longitudinal direction of the caterpillar track. In this way, the visual and/or haptic marking can be protected from being damaged or worn away before the wear limit of the grouser body has actually been reached.

According to one aspect of the present invention, the grouser body comprises a material of a first color and the grouser root comprises a material of a second color, the two colors being different from one another. In this way it can be easily identified visually that, to the extent to which the material of the first color has been worn away, for example by abrasion, the grouser body is also no longer present. Consequently, if the material of the first color has been worn away to the greatest extent or completely, the grouser body has also been worn away to a correspondingly great extent, and the wear limit can be regarded as reached.

According to a further aspect of the present invention, a colored material that differs in color from the material of the grouser body and from the material of the grouser root is arranged as a marking at least in some sections between the grouser body and the grouser root. In this way, the wear limit can be marked as a region or layer. If the colored marking is visible from above, for this the grouser body must have been worn away correspondingly, and so this can be regarded as an indication of reaching the wear limit. Furthermore, disappearance of the colored marking for example when viewed from the side may also be considered as exceeding of the wear limit, and so in this case at the latest the caterpillar track should for example be changed.

In this respect, the colored material as a marking may be arranged as a complete layer between the grouser body and the grouser root. This may be advantageous to form a full area marking of the wear limit, the reaching of which can be identified over the entire surface area of the outer profiling element. As a result, reaching of the wear limit can be identified as reliably as possible from any point of the outer profiling element when viewed from the grouser body.

Alternatively, the colored material as a marking may also only be arranged in some sections between the grouser body and the grouser root. Preferably, the colored material as a marking may take the form of a strip or bar running in the transverse direction through the outer profiling element. This may also be sufficient to allow the reaching of the wear limit to be visually identified reliably and in good time at least from the side in the transverse direction. At the same time, the outer profiling element may however remain unchanged in height or on the sides of its flanks, which may be in contact with an underlying surface. As a result, the materials, and consequently also their properties or effects, can remain as unchanged as possible in spite of the addition of a colored material according to the invention as a marking.

According to a further aspect of the present invention, the outer profiling element has a colored marking at least in some sections where the boundary between the grouser body and the grouser root runs; in particular, a colored marking that differs in color from the material of the grouser body and from the material of the grouser root has been applied there from the outside. In this way, a visual marking can be provided by a colored marking being incorporated in the grouser root or applied to the grouser root in such a way that reaching or exceeding of the wear limit can be visually identified by a user easily and reliably when the colored marking becomes damaged or worn away.

Also in this case, the colored marking may be provided in some sections, in particular on the side of the outer profiling element in the transverse direction, or running around. The respective properties and advantages have already been described above and are not to be repeated here.

According to a further aspect of the present invention, the outer profiling element has a depression and/or an elevation, at least in some sections, preferably running around, where the boundary between the grouser body and the grouser root lies. In this way, a marking of the wear limit that is both visually and particularly haptically identifiable can be created.

The elevation may also be formed from the material of the outer profiling element or for example be adhesively attached or vulcanized on as a separately formed element. If different materials are used for the grouser body and the grouser root, the elevation may preferably be assigned to one of the two elements and produced from the material thereof or from a third material.

As a depression, the marking may have been incorporated for example as a groove in the surface of the outer profiling element by subsequent removal of material after completion thereof, such as for example after vulcanization. Also, the depression may be formed by a mold in which the outer profiling element can be produced.

Elevations and depressions can in this case be combined with one another in a way similar to the previously described colored markings, in order to create a wear limit that can be identified as reliably and easily as possible.

According to a further aspect of the present invention, the grouser body and the grouser root comprise different materials, preferably consist of different materials.

This aspect of the present invention is based on the realization that, with all of the known rubber caterpillar tracks and the methods for producing them, it may be disadvantageous that the outwardly facing profiling can be subjected to different types of loading. For instance, the grouser bodies may be exposed to considerable abrasion due to contact with the underlying surface, and so greatest possible abrasion resistance may be advantageous here. Furthermore, the grousers are usually intended to have the best possible grip with the underlying surface. The grouser roots, however, are usually subjected to very dynamic loading. Therefore, least-possible heat build-up, great dynamic strength and good bonding to the layers of material lying further inward may be advantageous at this location.

These requirements are at least partially conflicting, and so it is always necessary to find a compromise between these requirements for the material of the grousers. This may lead to an only insufficient lifetime of the outwardly facing profiling or the external teeth of caterpillar tracks.

If, according to the invention, the grouser body and the grouser root comprise different materials or consist of different materials, the materials may be respectively chosen or formed in such a way that they are designed as well as possible for the respective requirements. As a result, the lifetime and/or the load-bearing capacity of the caterpillar track can be improved.

This aspect of the present invention is suitable in particular for being applied in the case of a method for producing rubber caterpillar tracks according to DE 10 2015 205 071 A1. The reason for this is that unvulcanized shaped elements that are intended to form the external teeth of the rubber caterpillar track are introduced there into corresponding apertures of the outer mold. Therefore, for easy and cost-effective implementation of the present invention, first the material that is intended to form the grouser body of the grouser may be introduced into the outer mold. Then the material that is intended to form the grouser root of the grouser may be introduced on top. Otherwise, the production method of DE 10 2015 15205 071 A1 can remain unchanged. Alternatively, the blank of the grouser comprising the grouser body and the grouser root may first be constructed from the different materials and then placed as one piece into the outer mold.

It is advantageous here that, in the case of the method for producing rubber caterpillar tracks according to DE 10 2015 205 071 A1, a comparatively small displacement of the tension members occurs. Consequently, flow movements between the other layers of material and between the grouser body and the grouser root during the vulcanization can also be avoided comparatively well, and so the two different material regions of the grouser body and the grouser root can be positioned and separated from one another comparatively reliably and reproducibly. In this way it can be achieved that the properties of the two different materials of the grouser body and the grouser root can also be arranged and used at the locations where they are intended.

According to a further aspect of the present invention, the grouser body comprises a material, preferably the grouser body consists of a material, which is more abrasion-resistant and/or can bring about better grip and/or can bring about better damping with respect to the underlying surface than the material of the grouser root. Preferably, the material of the grouser body may be more abrasion-resistant and/or cut-resistant than the material of the grouser root. Preferably, the material of the grouser body may alternatively or additionally have better damping and/or better grip with respect to the underlying surface, such as for example with respect to a road, than the material of the grouser root.

This makes it possible to achieve at the grouser body the properties that are advantageous r required precisely at this location. Natural rubber, a mixture of natural rubber and styrene-butadiene rubber or a mixture of natural rubber and isoprene rubber may preferably be used as materials of the grouser body with such properties.

According to a further aspect of the present invention, the grouser root comprises a material, preferably the grouser root consists of a material, which has less heat build-up and/or a greater dynamic strength and or better bonding to the material of the track body than the material of the grouser body. This makes it possible to achieve at the grouser root the properties that are advantageous or required precisely at this location. Natural rubber with hardness-increasing fillers, such as for example carbon black or silica, may preferably be used as the material of the grouser root with such properties.

According to a further aspect of the present invention, the material of the grouser body and/or the material of the grouser root comprises or comprise an elastomeric material, preferably the material of the grouser body and/or the material of the grouser root consists or consist of an elastomeric material. As a result, the outer profiling element can have properties of an elastomeric material that may be advantageous for the applications of caterpillar tracks.

According to a further aspect of the present invention, a plurality of tension members, preferably steel cables, are embedded in the track body. As a result, forces can be transmitted substantially in the transverse direction and/or in the longitudinal direction by way of the tension members. In particular, as a result tensile forces can be transmitted in the longitudinal direction of the caterpillar track.

Preferably, the caterpillar track is of an endlessly closed form in the circumferential direction, i.e. in the running-around direction, or in the longitudinal direction. In this case, the caterpillar track may already be produced as endlessly closed or first be produced as open and then be endlessly closed.

A number of exemplary embodiments and further advantages of the invention are explained below in conjunction with the following figures, in which.

The description of the aforementioned figures is given in Cartesian coordinates with a longitudinal direction X, a transverse direction Y, which is aligned perpendicularly to the longitudinal direction X, and a vertical direction Z, which is aligned perpendicularly both to the longitudinal direction X and to the transverse direction Y and which may also be referred to as the height Z.

Figure 1:
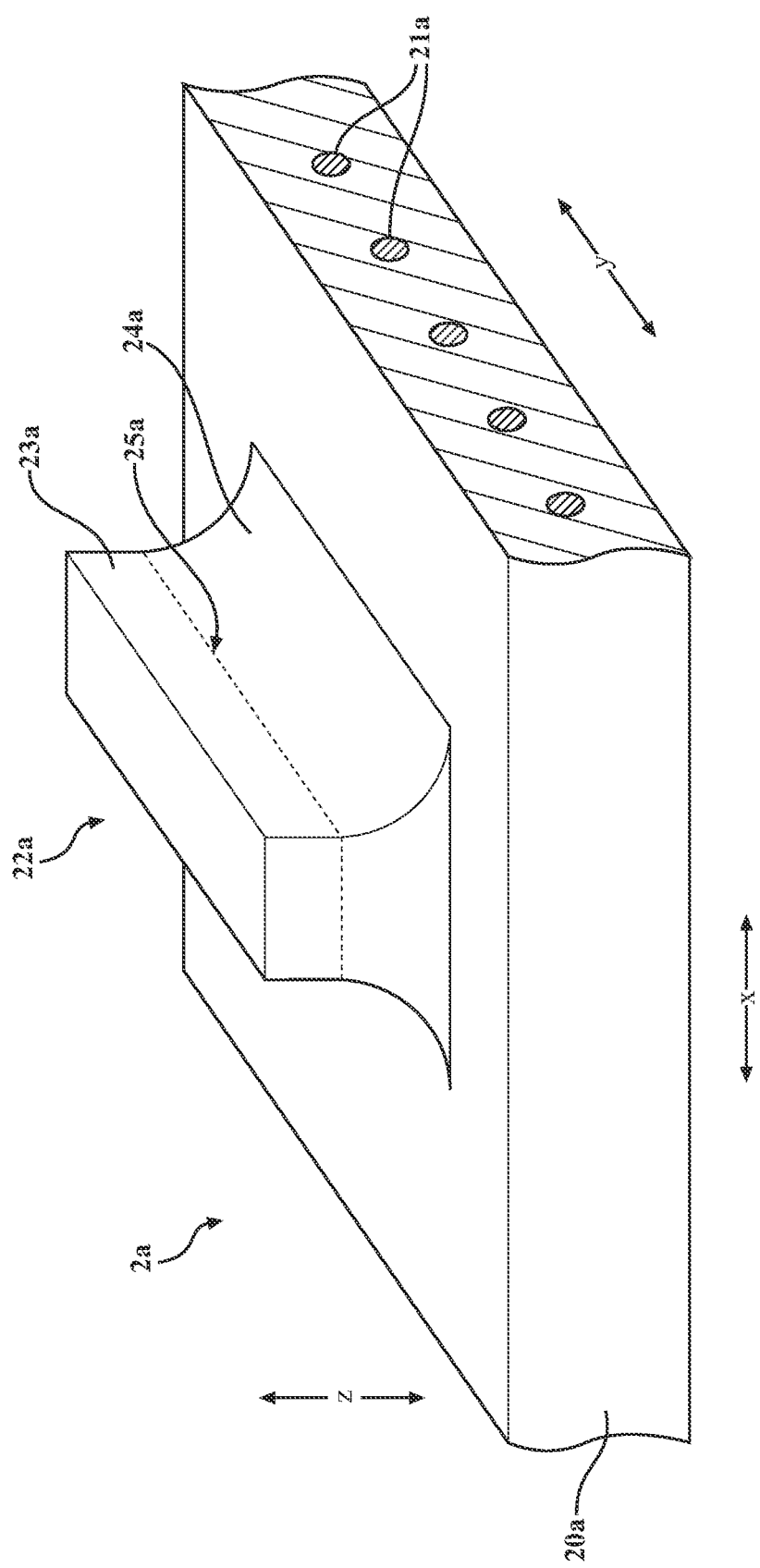
FIG. 1 shows a schematic perspective representation of a caterpillar track according to the invention according to a first exemplary embodiment.

FIG. 1 shows a schematic perspective representation of a caterpillar track 2a according to the invention according to a first exemplary embodiment. The caterpillar track 2a is formed as a rubber caterpillar track 2a and has a track body 20a, which is formed from an elastomeric material, in which a plurality of tension members 21a in the form of steel cables 21a are embedded. The track body 20a and the tension members 21a are endlessly closed in the circumferential direction or in the running-around direction X.

On the surface of its upper side, the track body 20a has a plurality of outer profiling elements 22a, of which one outer profiling element 22a-e, in each case is represented by way of example in FIGS. 1 to 5. The outer profiling element 22a, may also be referred to as a grouser 22a, which can be functionally divided into an upwardly facing grouser body 23a and a grouser root 24a, which connects the grouser body 22a to the track body 20a.

The area on which the grouser body 23a and the grouser root 24a meet may be regarded as the boundary 25a between the grouser body 23a and the grouser root 24a, which at the same time represents the wear limit 25a, the reaching of which can be regarded as indicating that the grouser body 23a has been worn away to such an extent that the rubber caterpillar track 2a should not be used any further.

According to the first exemplary embodiment of FIG. 1, the material of the grouser body 23a is of a different color than the material of the grouser root 24a. In this way, the grouser body 22a can be visually distinguished easily and reliably from the grouser root 24a, and so wearing of the grouser body 23a can also be visually identified easily and reliably. This can be used to deduce the degree of abrasion or wear of the grouser body 23a.

Instead of producing the grouser body 23a from a different-colored material or making it comprise a different-colored material, the grouser body 23a according to the first exemplary embodiment could also be coated by a different-colored layer, in order to have at least partially the properties described above. This can make it easier to implement the present invention according to the first exemplary embodiment.

However, using a different-colored material to form the first exemplary embodiment may be more reliable, because the color of the material can completely penetrate the grouser body 23a, and thereby be more reliably bonded to the grouser body 23a and also visible from above than an applied layer at the sides or flanks of the grouser body 23a.

Figure 2:
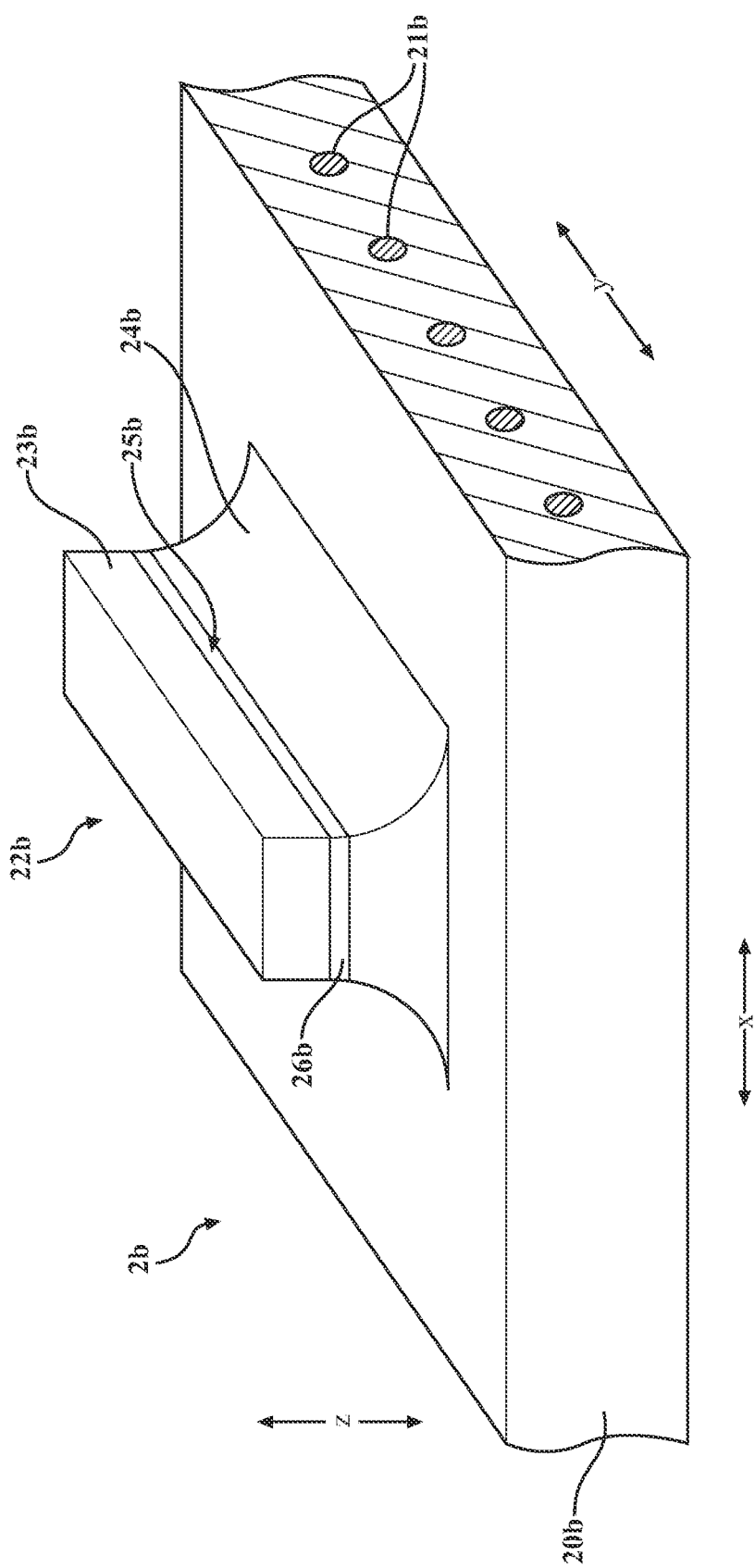
FIG. 2 shows a schematic perspective representation of a caterpillar track according to the invention according to a second exemplary embodiment.

FIG. 2 shows a schematic perspective representation of a caterpillar track 2a according to the invention according to a second exemplary embodiment. In this case, a colored material is arranged as a marking 26b between the grouser body 23b and the grouser root 24b, in order to mark the wear limit 25b, which may lie within the colored marking 26b or between the colored marking 26b and the grouser body 23b.

Figure 3:
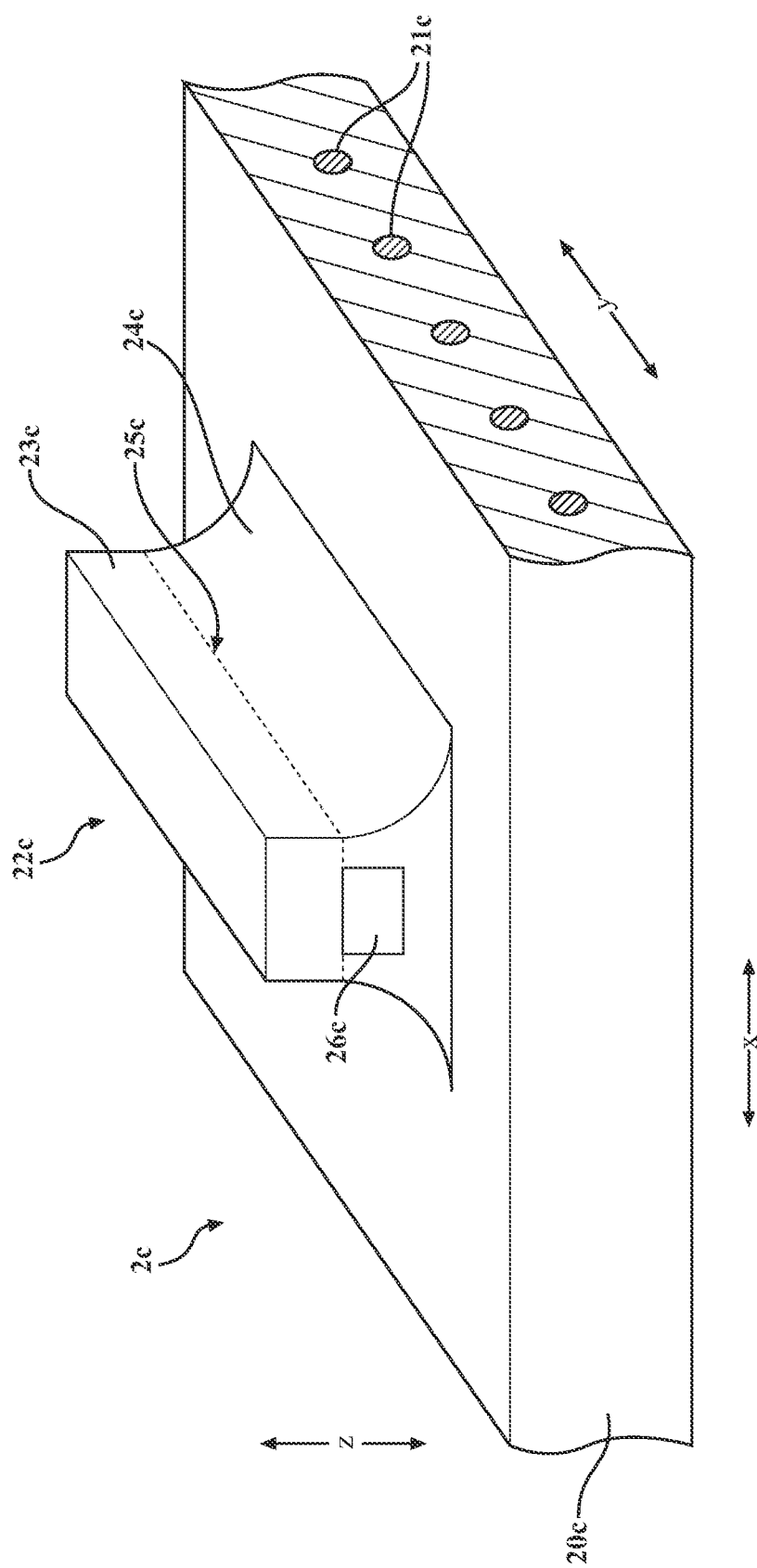
FIG. 3 shows a schematic perspective representation of a caterpillar track according to the invention according to a third exemplary embodiment.

FIG. 3 shows a schematic perspective representation of a caterpillar track 2c according to the invention according to a third exemplary embodiment. In this case, a colored material is incorporated as a marking 26c under the grouser body 23c in the grouser root 24c. A colored material may be used for this purpose in the form of a separate body, which at this point is introduced into a corresponding aperture of the grouser root 24c before the vulcanization and is vulcanized together with the grouser body 23c and the grouser root 24c. Such a separate body as an elastomeric colored material may be referred to as a vulcanette. In this way, a colored marking 26c can be easily implemented. Furthermore, the flanks of the grouser 22c can remain free of a marking 26c in the height Z and in the longitudinal direction X, since here the marking 26c could quickly disappear due to the abrasion caused by the underlying surface without reaching of the wear limit 25c being indicated.

Figure 4:
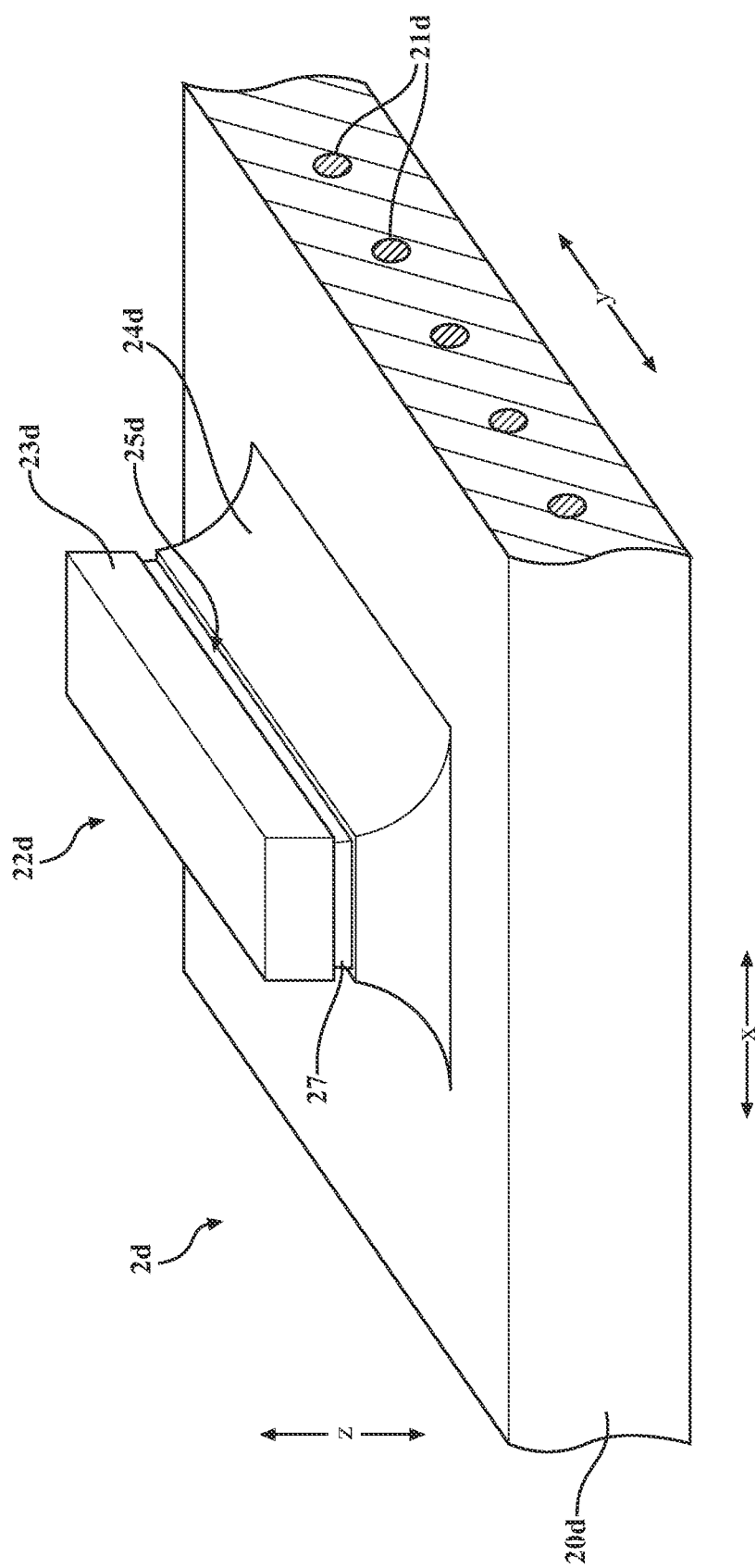
FIG. 4 shows a schematic perspective representation of a caterpillar track according to the invention according to a fourth exemplary embodiment.

FIG. 4 shows a schematic perspective representation of a caterpillar track 2d according to the invention according to a fourth exemplary embodiment. In this case, the wear limit 25d is marked by a running-around depression 27 in the form of a groove 27, and so the wear limit 25d can be identified both visually and particularly haptically.

Figure 5:
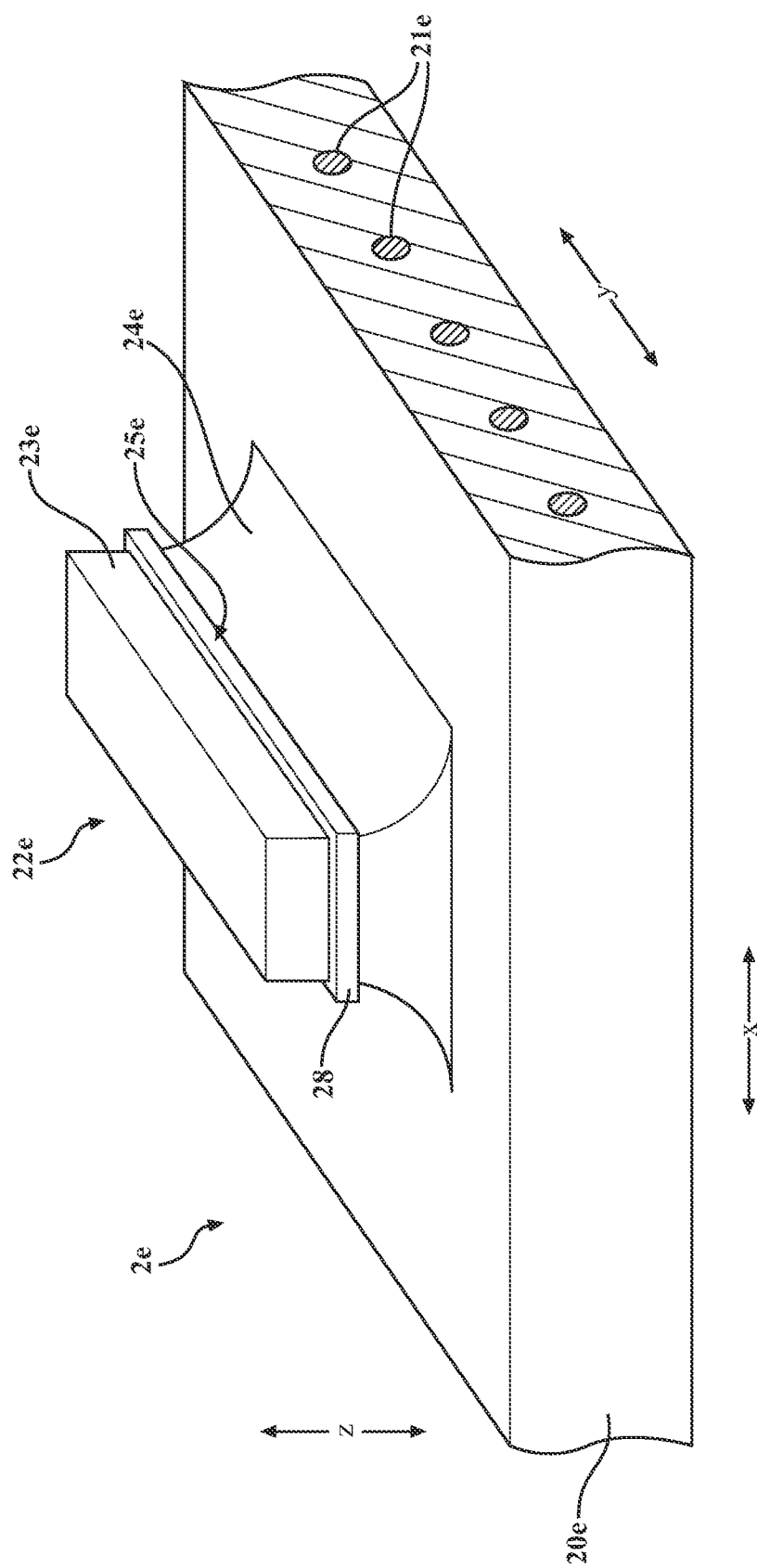
FIG. 5 shows a schematic perspective representation of a caterpillar track according to the invention according to a fifth exemplary embodiment.

FIG. 5 shows a schematic perspective representation of a caterpillar track 2e according to the invention according to a fifth exemplary embodiment. In this case, the wear limit 25e is marked by a running-around elevation 28 in the form of an edge 28, and so the wear limit 25e can be identified both visually and particularly haptically.

In all of the exemplary embodiments, the grouser body 23a-e and the grouser root 24a-e consist of two different elastomeric materials, which are designed for the respective requirements. Thus, the grouser body 23a-e consists of a material that is more abrasion-resistant than the material of the grouser root 24a-e. Consequently, if the wear limit 25a-e is reached, according to the invention it can be identified that the grouser body 23a-e, as the more abrasion-resistant part of the grouser 22a-e, has been worn away and that the grouser root 24a-e, as the less abrasion-resistant part of the grouser 22a-e, may then come into abrading contact with the underlying surface. Therefore, when the wear limit 25a-e is reached, the rubber caterpillar track 2a-e should not be used any further and should be replaced.

The invention claimed is:

1. A rubber caterpillar track comprising a track body having a plurality of outer profiling elements which are directed outwardly away from the track body, wherein each of the plurality of outer profiling elements comprises an outwardly directed grouser body and a grouser root, and wherein the grouser root connects the grouser body to the track body;
   wherein the outer profiling element comprises a marking which makes a boundary between the grouser body and the grouser root visually and haptically identifiable; and,
   wherein the grouser body comprises a material of a first color and the grouser root comprises a material of a second color, and wherein the first color and the second color are different from one another.

2. The rubber caterpillar track as claimed in claim 1, wherein the outer profiling element has, at the boundary between the grouser body and the grouser root one or more of a depression and an elevation.

3. The rubber caterpillar track as claimed in claim 1, wherein the grouser body and the grouser root consist of different materials.

4. The rubber caterpillar track as claimed in claim 3, wherein the grouser body consists of a material which provides one or more of higher abrasion-resistance, higher grip, and damping with respect to the underlying surface, in comparison to the material of the grouser root.

5. The rubber caterpillar track as claimed in claim 3, wherein the grouser root consists of a material which provides one or more of less heat build-up, greater dynamic strength, and better bonding to the material of the track body, in comparison to the material of the grouser body.

6. The rubber caterpillar track as claimed in claim 1, wherein the material of the grouser body comprises an elastomeric material, and wherein the material of the grouser root comprises elastomeric material.

7. The rubber caterpillar track as claimed in claim 1, further comprising a plurality of tension members embedded in the track body.

8. A rubber caterpillar track comprising a track body having a plurality of outer profiling elements which are directed outwardly away from the track body, wherein each of the plurality of outer profiling elements comprises an outwardly directed grouser body and a grouser root, and wherein the grouser root connects the grouser body to the track body;
 wherein the outer profiling element comprises a marking which makes a boundary between the grouser body and the grouser root visually and haptically identifiable; and,
 wherein a colored material that differs in color from the material of the grouser body and from the material of the grouser root is arranged as the marking at the boundary between the grouser body and the grouser root.

9. The rubber caterpillar track as claimed in claim 8, wherein the outer profiling element has, at the boundary between the grouser body and the grouser root one or more of a depression and an elevation.

10. The rubber caterpillar track as claimed in claim 8, wherein the grouser body and the grouser root consist of different materials.

11. The rubber caterpillar track as claimed in claim 10, wherein the grouser body consists of a material which provides one or more of higher abrasion-resistance, higher grip, and damping with respect to the underlying surface, in comparison to the material of the grouser root.

12. The rubber caterpillar track as claimed in claim 10, wherein the grouser root consists of a material which provides one or more of less heat build-up, greater dynamic strength, and better bonding to the material of the track body, in comparison to the material of the grouser body.

13. The rubber caterpillar track as claimed in 8, wherein the material of the grouser body comprises an elastomeric material, and wherein the material of the grouser root comprises an elastomeric material.

14. The rubber caterpillar track as claimed in claim 8 further comprising a plurality of tension members embedded in the track body.

15. A rubber caterpillar track comprising a track body having a plurality of outer profiling elements which are directed outwardly away from the track body, wherein each of the plurality of outer profiling elements comprises an outwardly directed grouser body and a grouser root, and wherein the grouser root connects the grouser body to the track body;
 wherein the outer profiling element comprises a colored marking which makes a boundary between the grouser body and the grouser root visually and haptically identifiable; and,
 wherein the colored marking differs in color from the material of the grouser body and from the material of the grouser root, and wherein the colored marking is disposed upon the outer profiling element outside surface.

16. The rubber caterpillar track as claimed in claim 15, wherein the outer profiling element has, at the boundary between the grouser body and the grouser root one or more of a depression and an elevation.

17. The rubber caterpillar track as claimed in claim 15, wherein the grouser body and the grouser root consist of different materials.

18. The rubber caterpillar track as claimed in claim 17, wherein the grouser body consists of a material which provides one or more of higher abrasion-resistance, higher grip, and damping with respect to the underlying surface, in comparison to the material of the grouser root.

19. The rubber caterpillar track as claimed in claim 17, wherein the grouser root consists of a material which provides one or more of less heat build-up, greater dynamic strength, and better bonding to the material of the track body, in comparison to the material of the grouser body.

20. The rubber caterpillar track as claimed in claim 15, wherein the material of the grouser body comprises an elastomeric material, and wherein the material of the grouser root comprises an elastomeric material.

\* \* \* \* \*